(12) United States Patent
Uytterhaeghe et al.

(10) Patent No.: US 6,495,086 B1
(45) Date of Patent: Dec. 17, 2002

(54) METHOD OF MAKING A PART OF A REINFORCED PLASTICS MATERIAL

(75) Inventors: Luc Uytterhaeghe, Arbent (FR); Charles-Guillaume Blanchon, Oyonnax (FR); Anthony Chene, Oyonnax (FR); Robert Charpy, Bellignat (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/548,342

(22) Filed: Apr. 12, 2000

(30) Foreign Application Priority Data

Apr. 12, 1999 (FR) .............................................. 99 04527

(51) Int. Cl.⁷ .......................... B29C 43/52; B29C 70/42
(52) U.S. Cl. ....................................................... 264/322
(58) Field of Search ......................................... 264/322

(56) References Cited

U.S. PATENT DOCUMENTS 4,961,700 A    10/1990  Dunbar

FOREIGN PATENT DOCUMENTS

| EP | 0 480 652 A1 | 4/1992 |
|---|---|---|
| EP | 0 588 363 A1 | 3/1994 |

Primary Examiner—Leo B. Tentoni
(74) Attorney, Agent, or Firm—Oliff & Berridge, PLC (57) ABSTRACT

A method of making a part made of a reinforced plastics material in a mold including at least two portions and from a reinforced sheet or from a lay-up of reinforced sheets including at least one reinforced sheet, in which method the reinforced sheet (4) is pre-heated. The reinforced sheet or the lay-up of reinforced sheets is presented to a first portion (1) of the open mold by a picking-up device including pressers (6a; 6b; 7), at least a region of the reinforced sheet or of the lay-up is applied against a corresponding region of the first mold portion by pressers on the picking-up device, the remainder of its surface is applied against the first mold portion while holding stationary the region of the reinforced sheet or of the lay-up, the mold is closed, and the resulting part is removed from the mold.

18 Claims, 5 Drawing Sheets

METHOD OF MAKING A PART OF A REINFORCED PLASTICS MATERIAL

BACKGROUND OF THE INVENTION

The present invention relates to a method of making a part made of a reinforced plastics material by overmolding a sheet, to a device for implementing the method, and to an assembly and to a production line including said device.

It is already known that single-layer sheets can be used to make parts made of plastics materials and having a certain stiffness, in particular for making structural parts of motor vehicles.

For example, with the material known as stampable reinforced thermoplastic (SRT), which is polypropylene reinforced with glass fibers, the method consists in heating sheets of SRT, then in depositing them in an open mold, and then in closing the mold to cause the plastics material to flow and to fill the cavity of the mold.

It is also known that multi-layer materials can be used that are obtained by superposing sheets of SRT and sheets of Twintex (a trademark of Verotex), Twintex being a woven sheet of commingled glass fibers and polypropylene fibers.

The Twintex sheets become soft during the heating prior to placing the lay-up of superposed sheets in the mold, but the SRT sheets are stiff enough to enable the heated material to be handled.

In contrast, when one or more sheets of Twintex only are to be overmolded, it is difficult to place them in the mold because the heated Twintex sheets are too soft and therefore difficult to handle.

As a result, the only known methods of overmolding sheets of Twintex consist in conveying the sheets horizontally from a heating station to the mold, which mold is mounted on a vertical press so that the portion of it that is to receive the sheet(s) of Twintex is horizontal.

This difficulty of handling heated sheets of Twintex therefore imposes, as a first limit to their being overmolded, the obligation of using molds that are mounted on vertical presses.

In addition, conveying the sheet of Twintex does not enable it to be positioned accurately enough in the mold. As a result, it is preferred to leave a safety margin by cutting the sheet of Twintex larger than necessary so as to make sure that it extends over the entire desired area of the part to be made, even if the edges of the sheet of Twintex that project beyond the periphery of the part then need to be cut off after the part has been molded.

A second limit to overmolding sheets of Twintex lies in the fact that the resulting parts must be trimmed after they have been molded.

SUMMARY OF THE INVENTION

An object of the present invention is to provide a method that solves all or some of the above-mentioned problems.

The present invention provides, in particular, a method of making a part made of a reinforced plastics material in a mold comprising at least two portions and from a reinforced sheet or from a lay-up of reinforced sheets comprising at least one reinforced sheet, in which method the reinforced sheet is pre-heated, said method being characterized by the fact that it comprises the following steps:

the reinforced sheet or said lay-up of reinforced sheets is presented to a first portion of the open mold by means of a picking-up device including pressers;

at least a region of the reinforced sheet or of said lay-up is applied against a corresponding region of the first mold portion by means of pressers on the picking-up device;

the remainder of its surface is applied against said first mold portion while holding stationary said region of the reinforced sheet or of said lay-up;

the mold is closed; and the resulting part is removed from the mold.

In the description below, the term "application portion" is used to designate that portion of the mold against which the reinforced sheet is applied.

The picking-up device may optionally be used to apply the remainder of the surface of the sheet or of said lay-up against the first portion of the mold.

It is possible to superpose a plurality of sheets in the mold, optionally with local reinforcements sandwiched between the sheets.

The above-mentioned region may correspond to at least one edge, and preferably both edges of the reinforced sheet or of said lay-up, or, in a variant, to a central zone.

The method of the invention offers the essential advantage of making it possible to automate positioning of the sheet or of said lay-up.

It can also make it possible to omit the trimming step consisting in cutting off the edges of the sheet or of said lay-up that project beyond the part obtained after overmolding. This is achieved because the edges of the sheet or of said lay-up can be positioned accurately relative to the mold. Once this positioning has been performed, the remainder of the sheet or of said lay-up is applied against the remainder of the first portion of the mold.

Use is thus made of the absence of stiffness of the sheet or of said lay-up to press it against the first portion of the mold, without it projecting from the periphery of the mold.

In a particular implementation, pressers are used that comprise rigid chocks mounted on actuators.

In a variant, a rigid chock comprises a plurality of elements separated by inflatable inserts that space them apart so that the chock hugs the shape of the first mold portion as well as possible.

The pressers may also be constituted by inflatable cases which, in the inflated state, exactly match the shape of the first mold portion.

In order to position it accurately on the first mold portion, the sheet or said lay-up is advantageously retained by needles disposed on the picking-up device.

When sheets and/or local reinforcements are superposed, such needles advantageously serve to hold the various superposed layers in position relative to one another, by being inserted into the lay-up.

Preferably, the needles are mounted on the same support as the pressers.

In a particular implementation, the needles are substantially parallel to the direction in which the mold closes.

Preferably, certain needles may be suitable for moving sideways to accommodate the deformations of the sheet or of said lay-up, when said sheet or said lay-up adapts its surface to fit the real surface of the application portion of the mold.

This adaptation may also be referred to as "draping", the initial surface of the sheet or of said lay-up being plane and corresponding to the developed surface area of the application portion of the mold, while the final surface of the sheet or of said lay-up has all of the relief of the application portion of the mold.

The needles mounted to move sideways are particularly useful when the sheet or said lay-up is not pre-shaped to the relief of the first portion of the mold.

In order to preform the sheet or said lay-up, it is possible, in a particular implementation, to deposit it on a rack of suitable shape and to heat it, e.g. by inserting it in an oven.

Pre-forming the sheet or said lay-up may further be supplemented prior to being put in place in the mold, by acting on the sheet or said lay-up at an intermediate station lying between the place at which the sheets are picked up and the mold.

In a particular implementation, the mold has a join plane that is substantially vertical.

The picking-up device may be carried by a manipulator arm which exerts the mechanical forces necessary to apply the sheet or said lay-up against the first portion of the mold.

In a variant, the picking-up device may be pulled towards the first mold portion to press the sheet or said lay-up thereagainst by means of a base mounted to move relative to the first mold portion.

This makes it possible to relieve the manipulator arm and to use a manipulator arm that is less powerful and therefore less costly.

Advantageously, abutments mounted to move relative to the base are used to entrain the picking-up device, these abutments being disposed to come into engagement over the picking-up device when the base is in the "out" position, and then remaining in place when the base is displaced to pull on the picking-up device.

In a particular implementation, the sheet or said lay-up is overmolded as applied against the first mold portion, i.e. a complementary quantity of plastics material is inserted into the mold in order to fill the entire cavity of the mold, it being possible for the filling to take place by depositing material in the open mold or by injecting material into the closed mold.

The present invention also provides a picking-up device for taking hold of one or more sheets.

This device comprises at least one presser that has a front face shaped like a region of a first mold portion, e.g. a portion of its periphery or a central zone, and first needles passing through said presser, which needles are mounted to move relative to the presser so that, in a first relative configuration of the presser and of the needles, the needles include end portions projecting beyond the front face of the presser, and, in a second relative configuration of the presser and of the needles, the same end portions of the needles are situated set back from the front face of the presser.

This device is used as follows.

With the presser(s) lying in the first configuration relative to the needles, the sheet is speared, e.g. at its periphery, with the end portions of the needles that project from the presser (s).

The sheet as held by the needles is then brought facing the first portion of the mold, and the device is move towards the mold so that the ends of the needles come flush with a predetermined region of the first portion of the mold, e.g. its periphery.

The presser(s) is/are then moved towards the first portion of the mold, while holding the needles in position relative thereto.

As a result, the needles are bared, and once the pressers have reached the second configuration relative to the needles, the sheet is then held only by compression between said pressers and the first portion of the mold.

A retaining system which may, for example, be constituted by needles or by any other mechanism integrated in the mold, then takes over from the pressers by holding the sheet in position in the mold, thereby making it possible to withdraw the picking-up device and to close the mold.

It can be understood that the device of the invention is particularly well suited to handling a sheet or a lay-up of sheets that is to be positioned vertically in a mold mounted on a horizontal press.

In a particular embodiment of the device, other needles that slope relative to the first needles serve to retain the sheet when the pressers lie in the first configuration relative to the needles.

The crossing over of the two sets of needles holds the sheet stationary on the device, thereby making it possible, in particular, to pick up a sheet from a horizontal plane.

The present invention also provides an assembly for applying a sheet against a first mold portion, said assembly being characterized by the fact that it includes the above-described picking-up device and a base mounted to move relative to the first mold portion so as to pull the picking-up device towards the first mold portion and to press the sheet or said lay-up thereagainst.

By means of this assembly, it is possible to avoid the need to use heavy-duty mechanical means to manipulate the picking-up device.

The base can deliver most of the forces necessary to applying the sheet against the first mold portion.

The assembly may include abutments mounted to move relative to the base, and suitable for engaging over the picking-up device when the base is in an "out" position, then for entraining the picking-up device when the base is displaced to pull on the picking-up device.

Preferably, the abutments are disposed at the ends of arms secured to the base.

In a particular embodiment, when the abutments are engaged over the picking-up device, they abut against at least one beam that is secured to the picking-up device and on which pressers are disposed.

Pressers may be fixed to the beam(s) in question with springs being interposed.

Advantageously, the mold has an outer side wall, and the base includes a frame that can slide in contact with said side wall.

The base being disposed on the first mold portion is particularly simple to implement, and also guarantees that the base is moved accurately relative to the first mold portion.

Preferably, the picking-up device is secured to a manipulator arm.

The manipulator arm may be released when the picking-up device is pulled by the base towards the first mold portion.

The present invention also provides a production line for manufacturing parts made of a plastics material reinforced by overmolding sheets, said production line being characterized by the fact that it includes a first picking-up device as described above, and a second picking up device serving to handle cold sheets so as to bring them firstly from a place of storage to an oven in which they are heated, then from the heating oven to a pre-forming station where they are shaped substantially to match the relief of the mold, the first picking-up device transferring the heated and pre-formed sheets to a mold.

In an advantageous variant, the second picking-up device is equipped both with a suction system which is suitable for picking-up cold sheets so as to transfer them to the heating oven, and also with a needle system which is suitable for picking up the heated sheets so as to transfer them to the pre-forming station, and then from the pre-forming station to the mold.

BRIEF DESCRIPTION OF THE DRAWINGS

In order to make the invention better understood, embodiments are described below by way of examples that do not limit the scope of the invention, and with reference to the accompanying drawings, in which.

DETAILED DESCRIPTION OF THE PREFERRED EMBODIMENTS

Figure 1:
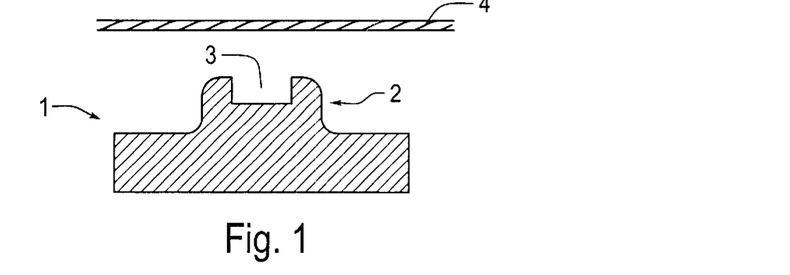
FIG. 1 is a section view showing a punching die of a mold serving to make a part of complex shape, and a plane reinforcement sheet that is to be put in place on said die.

In section, the punching die shown in FIG. 1 has relief 2 in its central portion, this relief itself being provided with a groove 3.

The die 1 serves to make a bumper beam for a motor vehicle.

The beam is made of polypropylene mixed with glass fibers and reinforced with a sheet 4 of a fiber-reinforced plastics material of the Twintex type.

The sheet of Twintex is rectangular, its width corresponding to the developed width of the die, which width is constant.

As described below, firstly the reinforcement sheet 4 is heated.

Figure 2:
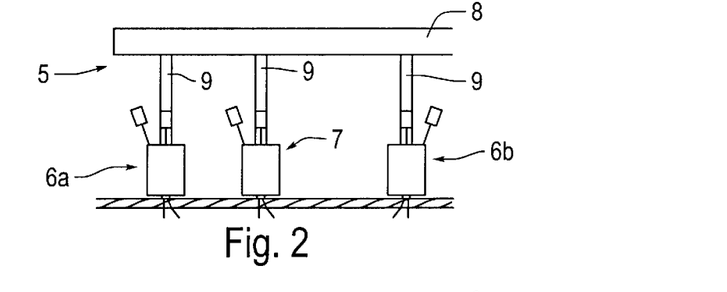
FIG. 2 is a section view of a picking-up device provided with needles, the device being shown as it is about to pick up the reinforcement sheet.

Once it has been heated, it is put in place over the die by means of a picking-up device 5 comprising two positioning side pressers 6a and 6b and a draping central presser 7, which pressers are mounted on a slide rail 8 via actuators 9.

Figure 5:
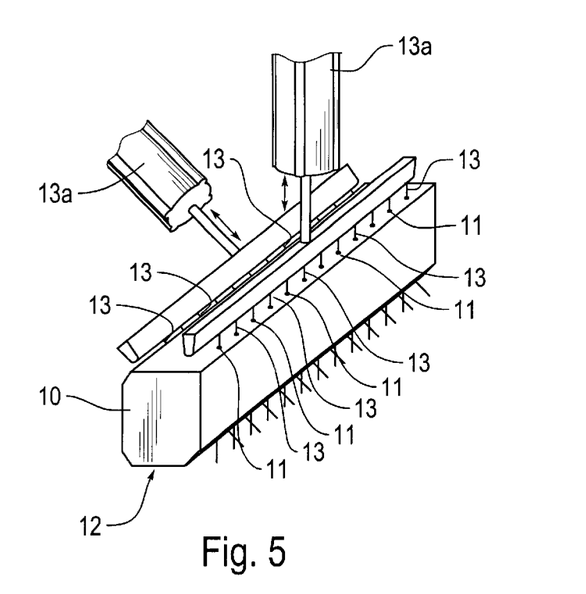
FIG. 5 is a perspective view of a presser provided with needles of the device of FIGS. 2 to 4.

Each of the pressers is shown in detail in FIG. 5 from which the actuators have been omitted for reasons of clarity.

Each presser is made up of an elongate block 10 provided with two sets of through bores 11, the first set of bores being perpendicular to the join plane of the mold, i.e. to the front face 12 of the presser, and the second set slants relative to the first set.

Each set of bores 11 receives a respective set of needles 13 moved by actuators 13a. The two sets of needles 13 cross in the vicinity of the front face 12 of the presser, each set of needles being mounted to slide axially relative to the presser.

As shown in FIG. 2, the two positioning side pressers 6a and 6b and the draping central presser 7 are secured to the sheet of Twintex by the crossing over of their respective sets of needles 13.

Figure 3:
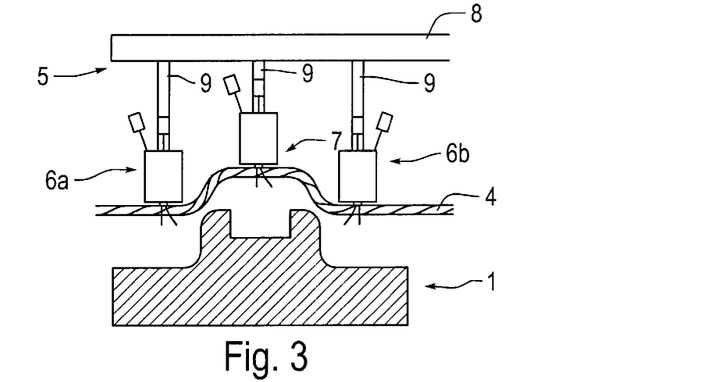
FIG. 3 is a view analogous to FIG. 2, showing the device and the sheet during pre-forming, immediately before the reinforcement sheet is deposited on the die.

One of the side pressers (6b, i.e. the side presser on the right of the figures) is then moved in translation towards the center of the device, while the central presser 7 is placed above the initial plane of the sheet of Twintex, thereby pre-forming the sheet to the general relief of the die, as shown in FIG. 3.

Figure 4:
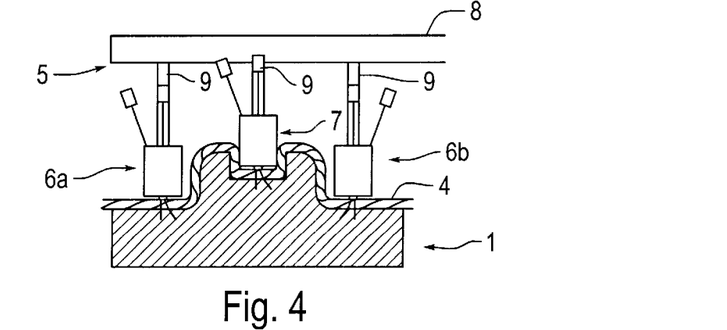
FIG. 4 is a view analogous to the preceding figures, showing the reinforcement sheet in its ultimate draped state.

The sheet, as thus roughly pre-formed, is then conveyed to the die, against which it is applied, firstly via its edges that coincide with the periphery of the die, by means of the side pressers 6a and 6b, then by means of the draping central presser 7 which presses the central zone of the sheet of Twintex against the bottom of the groove 3.

It is then necessary merely to withdraw the picking-up device and to close the mold in order to overmold a reinforced beam, from which beam no edge of the sheet of Twintex projects.

Figure 6:
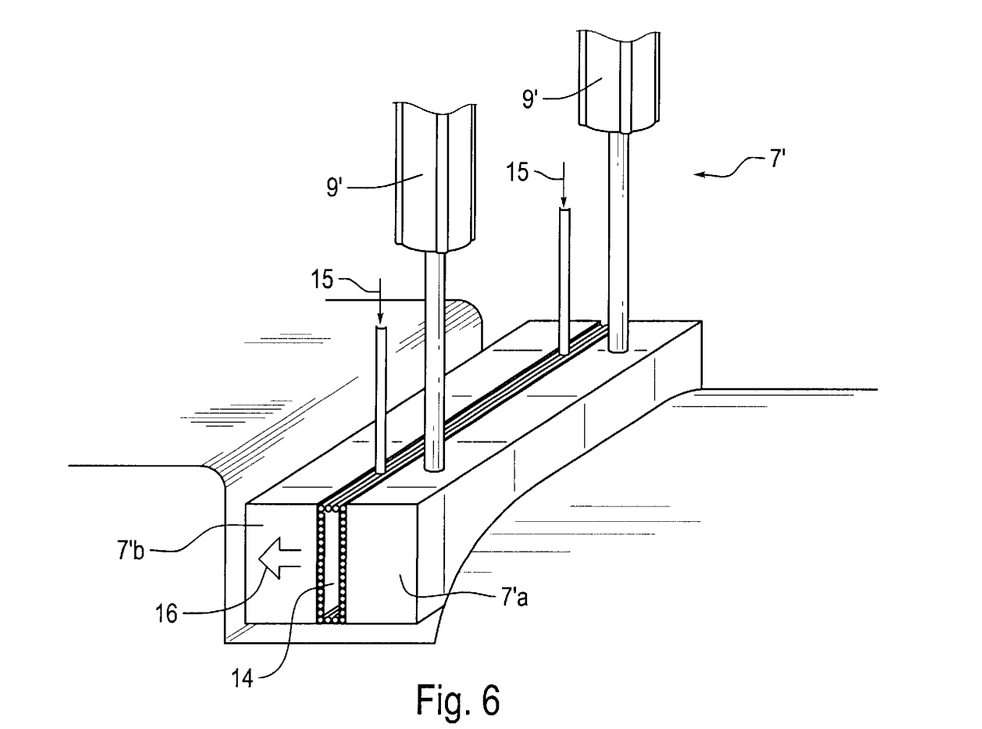
FIG. 6 is a perspective view of a presser provided with an inflatable insert.

FIG. 6 shows a variant of the draping central presser 7' which is made up of two elongate blocks 7'a and 7'b, one of which (7'a) is secured to the actuators 9' that connect it to the slide rail, and the other of which (7'b) is connected to the first block 7'a via a transverse slide mechanism (not shown).

As shown by the arrows 15 and 16 in FIG. 6, the insert 14 being inflated moves the two elongate blocks apart and applies the reinforcement sheet firmly against the walls of the groove 3 in the die.

As a result, the reinforcement sheet is draped optimally over the die, the edges of the reinforcement sheet also being suitably positioned and held by the side pressers of the device.

Figure 7:
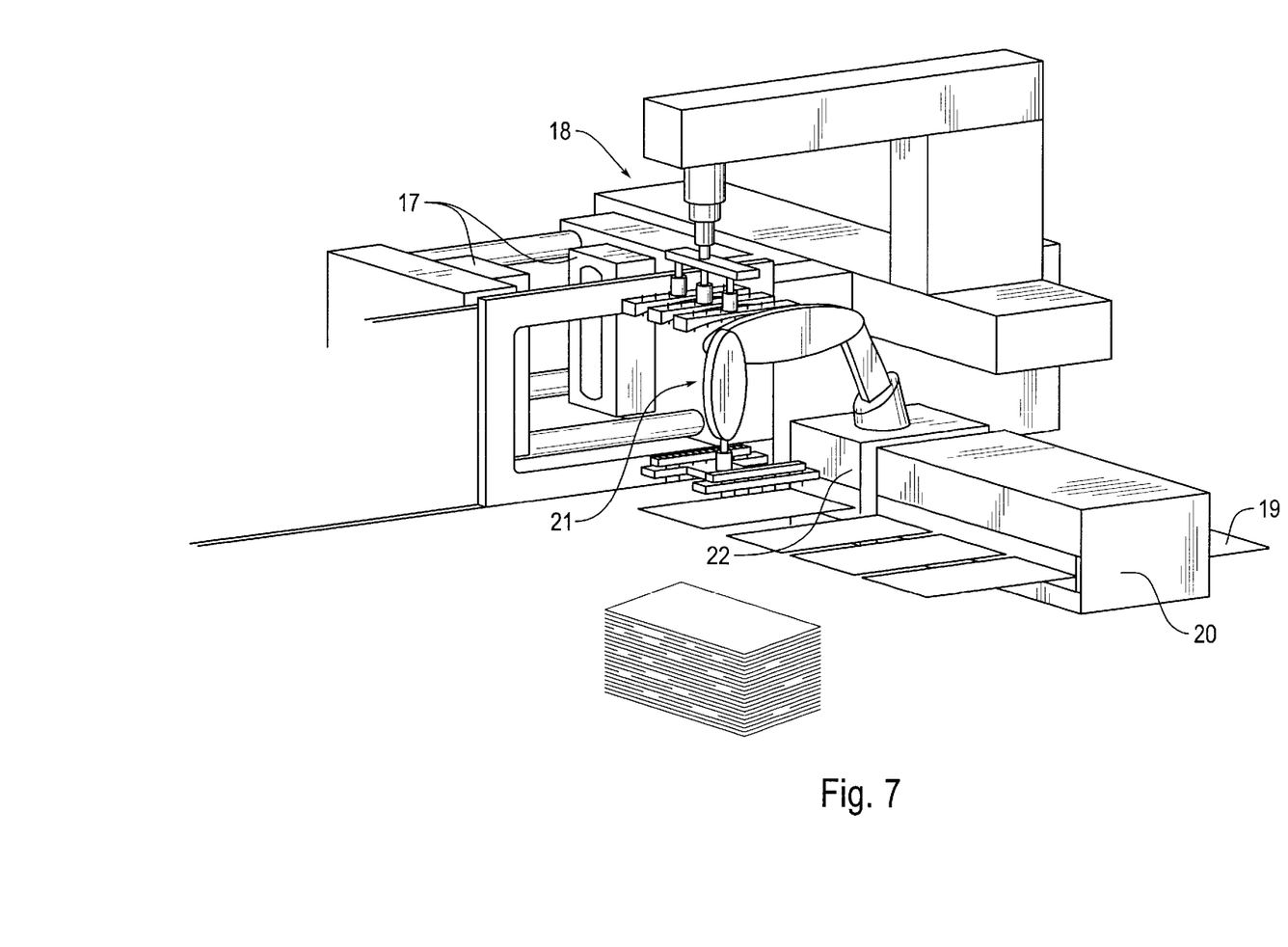
FIG. 7 is an overall perspective view of a production line for manufacturing reinforced parts.

As shown in the overall view given in FIG. 7, a mold 17 is mounted on a vertical press, and a picking-up device 18 of the above-described type is mounted in the vicinity of said mold.

The device is mounted on a rail which makes it sufficiently mobile to move towards and away from the mold 17.

The reinforced sheets picked up by the picking-up device for the purposes of pre-forming them and putting them in place in the mold have been heated and optionally pre-formed on stations further up the production line.

From upstream to downstream, the production line is made up of a loading station 19 on which an operator places cold reinforcement sheets, of an infrared oven 20 which heats individually each reinforcement sheet that is placed on the loading station and delivers it at the end of the oven that is further from the loading station, and of a second picking-up device 21 which picks up the heated sheets and can place them in two different places depending on the type of part to be made.

For a part using a plurality of reinforcement sheets, the second picking-up device 21 stacks up the reinforcement sheets exiting from the oven and then, when there are enough of them, places them on a pre-forming rack. The sheets as stacked up for pre-forming purposes are inserted into a hot-air oven 22 so as to bring them to the temperature at which they were on exiting from the infrared oven 20.

For a part using a single reinforcement sheet, the second picking-up device 21 makes the reinforcement sheets available directly to the first picking-up device 18 so that they can be placed immediately in the mold 17.

It should be noted that the picking-up device 18 made up by pressers each having two sets of needles is particularly well suited to handling heated reinforcement sheets of the Twintex type, and to handling them in a vertical position, as applies in the production line shown in FIG. 7.

Firstly, the heated sheets are easy to spear, and secondly the heated sheets are easy for the needles to hold because said needles are perpendicular to the plane of the sheet.

In addition, the vertical position of the sheet makes it possible to remove firstly the slanting set of needles on putting the draped sheet in place in the mold, without said sheet being released from the picking-up device.

Once the slanting needles have been removed, the presser (s) can be moved towards the mold by baring the needles which then serve as guides for holding the reinforcement sheet in position in the mold.

Thus, the needles serve not only to pick up the sheet, but also to position it accurately in the mold.

Figure 8:
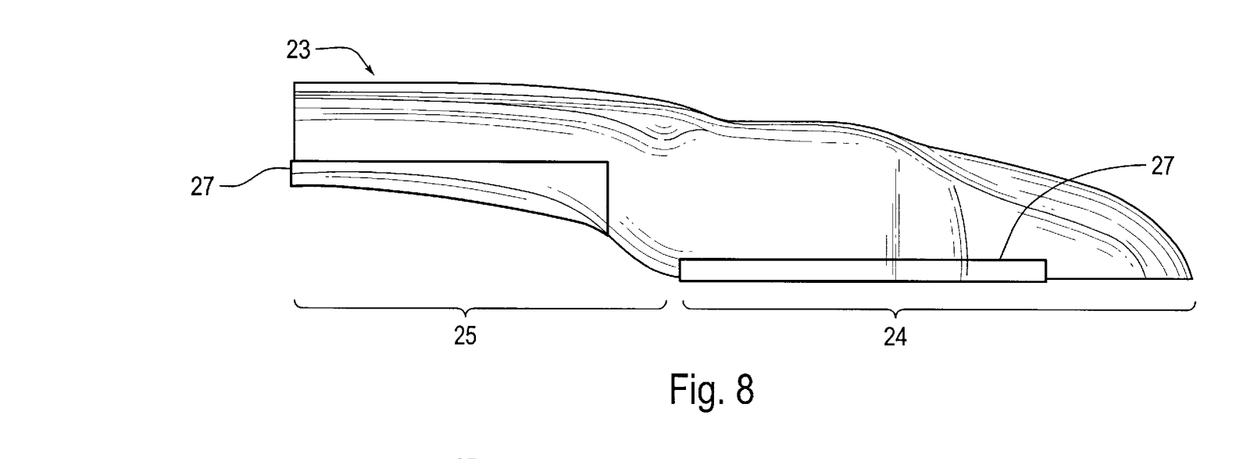
FIG. 8 is an elevation view of a bumper beam.
Figure 9:
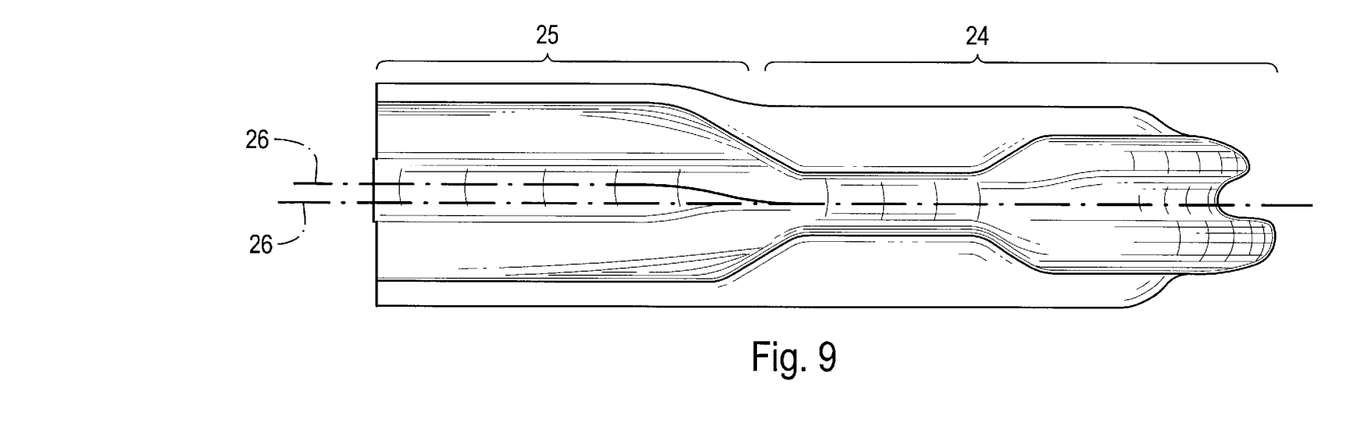
FIG. 9 is a view from above of FIG. 8.

In the example shown in FIGS. 8 and 9, the beam 23 is of symmetrical shape over a portion 24 of its length and of asymmetrical shape over the remainder 25 of its length. FIG. 9 shows dot-dash lines 26 joining up the middles of the widths of the beam before and after draping, and it can be observed that these lines are separate in the portion 25 of the beam.

This non-coincidence of the middles of the widths might pose a problem for draping the reinforcement sheet if said draping were performed in this embodiment by starting from the center of the part to be made.

However, in this embodiment of the invention, the reinforcement sheet is positioned via its edges which are applied firstly against the periphery of the mold, so draping the reinforcement sheet over a non-symmetrical die raises no difficulty.

That is why applying the pressers against the zones 27 shown in bold lines in FIG. 8 makes it possible to obtain the non-symmetrical beam shown in FIGS. 8 and 9.

Naturally, the above-described embodiments are in no way limiting, and any desirable modifications may be made to them without going beyond the ambit of the invention.

Figure 10:
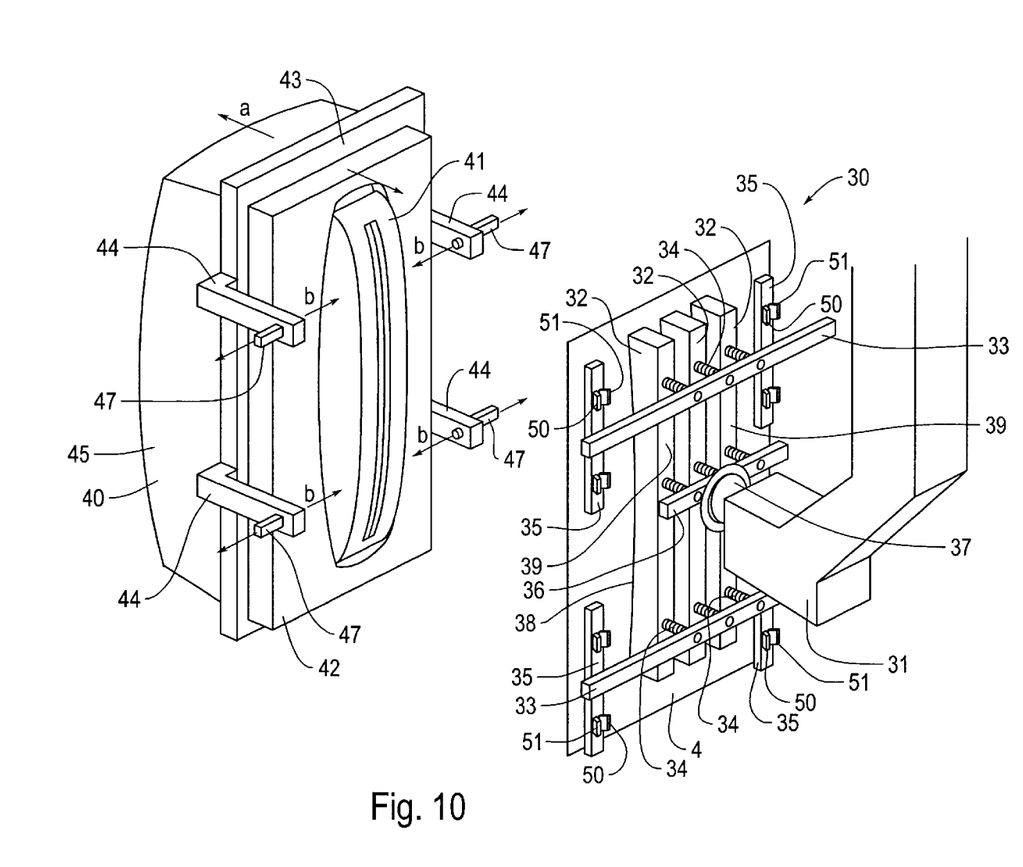
FIG. 10 is a diagrammatic perspective view of an assembly including the picking-up device and a base mounted to move relative to a first portion of the mold.

For example, as shown in FIG. 10, it is possible to make an assembly serving to make it possible to use a manipulator arm that is less powerful.

In addition to a picking-up device 30, the assembly comprises a base 43 that is mounted to move relative to a first mold portion 40 and that is suitable for pulling the device 30 onto said mold portion to press a sheet 4 against it.

The picking-up device 30 is secured to a manipulator arm 31 and it includes three central pressers 32 and four peripheral pressers 35 that are shorter than the central pressers 32 and that are disposed substantially at the four corners of the picking-up device.

Each presser 32 or 35 has a front face 38 for applying the sheet 4 against the first mold portion 40, and a rear face 39.

The pressers 32 and 35 are supported by a set of parallel beams comprising a central beam 36, and two side beams 33 that extend over substantially the entire width of the sheet 4.

The central pressers 32 are fixed to the beams 33 and 36 with springs 34 being interposed that come into abutment at one end against the beams 33 and 36, and at the other end against their rear faces 39.

The peripheral pressers 35 may optionally be moved relative to the beams 33 while the sheet 4 is being draped over the mold portion 40 and they are provided with sets of straight needles 50 and with sets of slanting needles, as in the above-described embodiments.

The springs 34 make it possible for the pressers 32 to adapt to fit the shape of the first mold portion 40 on clamping the picking-up device 30 thereagainst.

In a variant, it is possible to replace the springs 34 by actuators.

However, the use of springs offers the advantage of being simpler and lower in cost than the use of actuators.

The first mold portion 40 is suitable for co-operating with a second mold portion (not shown) on closing the mold, the two mold portions being mounted on a horizontal press.

The mold portion 40 has a die 41 provided with a central groove and serving to shape the sheet 4 so as to form a beam for a motor vehicle.

It also has a plane peripheral surface 42 around the die 41 and serving as an abutment surface for the peripheral pressers 35.

The mold portion 40 has an outer side surface 45 on which the base 43 slides, which base is mounted to move in a direction a.

The base 43 includes a rectangular frame on which four arms 44 are disposed, which arms extend towards the second mold portion.

Each of the arms 44 is provided with an abutment 47 that is mounted to move in a direction b that is perpendicular to the direction a, each abutment 47 being suitable for coming into abutment against one of the rear faces of the beams 33 when the base 43 is in an "out" position.

A description follows of the steps of an operation of draping the sheet 4 over the first mold portion 40 by means of said assembly, the base 43 being initially in an "out" position in which the abutments 47 have been moved to the maximum extent towards the second mold portion.

The picking-up device 30 starts by picking up a hot sheet 4 and presenting it to the first mold portion 40.

The picking-up device 30 then applies the sheet 4 against the first mold portion 40 by exerting a small pressure on the sheet 4 so as to hold it against said mold portion.

The central pressers 32 engage over the die 41 and they hold the sheet 4 stationary relative to the first mold portion at the level of said die.

The sheet 4 is thus brought into register relative to the first mold portion.

The abutments 47 are then actuated so as to come into abutment against the rear faces of the beams 33.

The manipulator arm 31 is declutched, and the base 43 is displaced by means of an actuator drive mechanism (not shown) over a predetermined distance away from the second mold portion so as to pull on the picking-up device 30.

The central pressers 32 hold the sheet 4 applied against the die 41 and stationary relative thereto.

Then the abutments 47 are displaced towards the outside of the first mold portion 40, and the picking-up device is removed, the sheet 4 being held pressed against the first mold portion 40 by retaining means (not shown) until the mold is closed.

The use of the base 43 makes it possible to prevent the manipulator arm 31 from having to exert large forces in order to press the sheet 4 against the first mold portion 40, the forces necessary to clamp the picking-up device 30 against the first mold portion 40 being delivered substantially by the displacement of the base 43.

What is claimed is:

1. A method of making a part of a reinforced plastics material in a mold, said mold comprising at least two portions, the method comprising:

preheating at least one of a reinforced sheet and a lay-up of sheets comprising at least one reinforced sheet;

presenting the at least one of the reinforced sheet and the lay-up of sheets to a first portion of the open mold by using a picking-up device including pressers;

applying at least a region of the at least one of the reinforced sheet and the lay-up of sheets against a corresponding region of the first mold portion by using the pressers;

applying a remainder of the surface of the at least one of the reinforced sheet and the lay-up of sheets against said first mold portion while holding stationary said region of the at least one of the reinforced sheet and the lay-up of sheets;

closing the mold to mold the part; and removing the part from the mold.

2. A method according to claim 1, wherein said region corresponds to at least one edge of the at least one of the reinforced sheet and the lay-up of sheets.

3. A method according to claim 1, wherein said region corresponds to a central zone of the at least one of the reinforced sheet and the lay-up of sheet.

4. A method according to claim 1, wherein the pressers comprise rigid chocks mounted on actuators.

5. A method according to claim 4, wherein at least one said rigid chock comprises a plurality of elements separated by inflatable inserts that space the elements apart so that the chock hugs substantially the shape of the first mold portion.

6. A method according to claim 1, wherein the picking-up device includes needles.

7. A method according to claim 6, wherein the needles are mounted on a same support as the pressers.

8. A method according to claim 6, wherein the needles are substantially parallel to a direction in which the mold closes.

9. A method according to claim 6, wherein the needles are suitable for moving sideways to accommodate the deformations of at least one of the sheet and the lay-up of sheets, when said at least one of the sheet and the lay-up adapts its surface to fit the real surface of the application portion of the mold.

10. A method according to claim 1, wherein prior to conveying onto the first mold portion, the at least one of the sheet and the lay-up is pre-formed by depositing on a rack of suitable shape and by heating.

11. A method according to claim 10, wherein the at least one of the sheet and the lay-up is pre-formed at an intermediate station lying between a place at which the sheets are picked up and a mold.

12. A method according to claim 1, wherein the mold has a join plane that is substantially vertical.

13. A method according to claim 1, wherein the picking-up device is carried by a manipulator arm.

14. A method according to claim 1, wherein the picking-up device is pulled towards the first mold portion to press the at least one of the sheet and the lay-up there-against by means of a base mounted to move relative to the first mold portion.

15. A method according to claim 1, wherein the at least one of the sheet and the lay-up is overmolded as applied against the first mold portion, by inserting a complementary quantity of plastics material into the mold in order to fill the entire cavity of the mold.

16. A method according to claim 2, wherein said region corresponds to all edges of the at least one of the reinforced sheet and the lay-up of sheets.

17. A method according to claim 15, wherein the quantity of plastics material is inserted into the mold by depositing the plastics material in the open mold.

18. A method according to claim 15, wherein the quantity of plastics material is inserted into the mold by injecting material into the closed mold.

* * * * *